United States Patent
Meinhardt

(10) Patent No.: US 8,032,412 B2
(45) Date of Patent: Oct. 4, 2011

(54) COLLECTING AND PAYING MICROPAYMENTS FOR INTERNET AND WIRELESS PURCHASE OF COPYRIGHT MATERIAL

(75) Inventor: Mark M. Meinhardt, Eagan, MN (US)

(73) Assignee: Unisys Corporation, Blue Bell, PA (US)

( * ) Notice: Subject to any disclaimer, the term of this patent is extended or adjusted under 35 U.S.C. 154(b) by 3546 days.

(21) Appl. No.: 10/228,546

(22) Filed: Aug. 27, 2002

(65) Prior Publication Data
US 2004/0054596 A1 Mar. 18, 2004

(51) Int. Cl.
*G06Q 30/00* (2006.01)
(52) U.S. Cl. ...................................................... 705/14.4
(58) Field of Classification Search .................. 705/14.4, 705/35, 36 R, 37–40
See application file for complete search history.

(56) References Cited

U.S. PATENT DOCUMENTS

| | | | |
|---|---|---|---|
| 5,424,524 A * | 6/1995 | Ruppert et al. | 705/17 |
| 5,706,507 A * | 1/1998 | Schloss | 709/225 |
| 6,202,056 B1 | 3/2001 | Nuttall | |
| 6,292,789 B1 | 9/2001 | Schutzer | |
| 6,639,975 B1 | 10/2003 | O'Neal et al. | |
| 2001/0047334 A1 | 11/2001 | Nappe et al. | |
| 2002/0065736 A1 * | 5/2002 | Willner et al. | 705/26 |
| 2002/0069176 A1 * | 6/2002 | Newman | 705/53 |

FOREIGN PATENT DOCUMENTS
EP 1 414 185 4/2004
WO WO 02/080061 10/2002
* cited by examiner Primary Examiner — Olabode Akintola
(74) Attorney, Agent, or Firm — Robert P. Marley; Nawrocki, Rooney & Sivertson, P.A.

(57) ABSTRACT

An apparatus for and method of transacting business over a network, such as the Internet. The technique is applicable to a number of e-commerce applications, but the low transaction cost permits its use with microsales involving micropayments of less than one U.S. dollar. An Internet user requests a purchase from a content provider via the user's Internet Service Provider. The Internet service provider records the transaction in a transaction log. The content provider records the transaction in an invoice log. At the end of a billing cycle, a transaction reconciler performs a reconciliation of all transaction logs from all Internet service providers with all invoice logs from all content providers. After correction of any errors found, each Internet service provider is billed by the transaction reconciler for all purchases made by its subscribing users during the purchase period. The payments are collected by the transaction reconciler and paid over to the content providers on the basis of the reconciled invoice logs.

15 Claims, 4 Drawing Sheets

COLLECTING AND PAYING MICROPAYMENTS FOR INTERNET AND WIRELESS PURCHASE OF COPYRIGHT MATERIAL

CROSS REFERENCE TO CO-PENDING APPLICATIONS

None.

BACKGROUND OF THE INVENTION

1. Field of the Invention

The present invention generally relates to data processing systems employed in e-commerce and more particularly relates to apparatus and methods for collection of micropayments (i.e., small individual charges) for services provided to e-commerce customers.

2. Description of the Prior Art

It is known in the art to offer goods and services for sale over the Internet. This approach has substantial advantages over normal "brick and mortar" retailing particularly for certain types of goods.

For example, for relatively large dollar, unique items, the Internet provides a low cost means for establishing contact between the seller and potential buyer. Typical of such activity is real estate. A potential buyer will, of course, in most instances insist upon traveling to the real estate for in person inspection before the actual contract of sale. However, the Internet, particularly with graphical and photographic display capabilities, permits a potential buyer to readily make "first level" purchasing decisions by making a determination of whether the potential purchase meets the basic requirements. It is important that such "first level" purchasing decisions can be made quickly and accurately under highly convenient and low cost conditions.

Another type of retailing situation for which the Internet offers substantial advantages is essentially "catalog" sales. In the past, such sales were made primarily by sending copies of retail catalogs to likely purchasers. Historically, Montgomery Wards, Sears, etc. participated in large volume annual sales utilizing the mail order catalog. The Internet has greatly improved this process by decreasing the catalog distribution costs and potentially increasing the availability to a larger portion of the set of potential purchasers, because any reasonable Internet user wishing to make a particular purchase can self initiate access to the on-line "catalog". This Internet improvement continues to preserve the advantages of the previous mail order catalog process, such as low overhead costs, consolidated inventory, etc., but adds a certain responsiveness to the process. Thus, the "catalog" is not published annually, but can be modified on a minute to minute basis to accommodate newly available goods, changes to pricing strategy, etc.

A third type of sale, "micro-sale", has the potential for large future dollar volumes. Such micro-sales are characterized by extremely low individual purchase prices. Typically, this may be less than one U.S. dollar per purchase. Oftentimes, the goods or services can be directly delivered over the Internet. The playing of a recording, performance of a specialized search, etc. are representative of goods and services suitable for micro-sale.

The major difficulty with a micro-sale is the cost of collecting the corresponding "micro-payment". For payments of less than several dollars, traditional payment credit card, debit card, invoice and corresponding personal check, are simply too expensive to permit cost effective micro-sales. Subscription services wherein the user prepays for content unnecessarily constrains the user to limited future purchases.

SUMMARY OF THE INVENTION

The present invention overcomes the disadvantages of the prior art by providing apparatus and methods which permit micropayments corresponding to microsales to be inexpensively and easily handled. Because of the cost savings with this approach, it is assumed that the technique is equally suitable for virtually all e-commerce, including transaction which are not microsales. However, it is with regard to the small individual transaction value of microsales that the technique is deemed most necessary.

The micropayment transaction system of the present invention contains five software applications which work together and complement each other to reconcile the micropayments via the Internet or other suitable network. These software applications are:

1. Invoice Log Database;
2. Purchase Log Database;
3. Transaction Reconciler;
4. User Interface Dialog; and
5. Content Manager.

The Invoice Log is a database application that records requests for content (i.e., goods and services). It is part of the Content Provider's (i.e., Seller's) system and logs file requests as they are executed. The application consists of two parts:

a) a transaction monitor that resides on the content server that monitors transaction requests and records those that involve fee payments: and b) a database that contains the transaction data.

The monitor returns a fee amount to the User Interface Dialog and awaits confirmation of fee acceptance. After acceptance, the request is processed and logged into the database.

The database record consists of the following fields:

REQUESTER (service Provider ID, such as ISP address and User ID if available);

DATA AND TIME of the request;

FILE requested; and

PRICE of the request (obtained from another database created with Content Manager.

This database is sent periodically (probably overnight) to the Transaction Reconciler for collection of payments.

The Purchase Log functions exactly the same way as the Invoice Log except it resides on the Service Provider's system (e.g., AOL, MSN, Verizon, etc.) and monitors requests by its users. It serves two purposes: 1) to ensure that the Content Provider's database is accurate; and 2) to log transactions from cached sources. Ideally the Purchase Log has the same fields as the Invoice Log except that the Service Provider will always accommodate the User ID, but may not always have the Price, unless previously provided. Like the Invoice Log, the data from the Purchase Log is sent periodically (probably overnight) to the Transaction Reconciler for collection of payments.

The Transaction Reconciler is the heart of the system. In the preferred mode of the present invention, it compares the Invoice Log to the Purchase Log to determine accurate billing and payment information. It generates a request for payment to all the Service Providers and creates a payment transaction for each Content Provider. Data is transacted on a periodic basis, probably at the end of each month, with payment to the Content Providers made quarterly. It also receives request for reversal of transactions to correct errors. The Transaction Reconciler runs automatically, without human intervention.

Some "fuzzy logic" may be helpful to compare transactions with slightly different data (time stamp, for example). It also needs to consider posting times to properly account for all transactions.

The User Interface Dialog works in conjunction with the Invoice Log Database application to ensure that the user desires to purchase the content and accepts the resulting fee. It consists of a dialog box that appears after the user requests the content. The User Interface Dialog needs to be conformed to the overall transmission medium (for web and wireless versions). An option allows the user to waive the dialog box, however, it is strongly recommended that the Service Providers decide if this option would be available to particular users. This dialog is preferably of Java scripting or a plug in that must be installed once before the first purchase. It is recommended that the approach be one that is intuitive and easy for the user. Once the fee is accepted, the transaction proceeds, otherwise the transaction is canceled.

Security is crucial to the acceptance of the application by the public. The design includes user authentication security to ensure that the user is properly identified, and the hackers cannot use false or stolen ID's to steal content.

The Content Manager is a set of tools for the content designer (for example web page) to be able to tag objects as requiring fees and to create entries in the Content Database. It consists of two parts: the tool set; and the database. The tool set is simply a tagging scheme which may require content to be placed in specific server directories that are monitored by the Invoice Database application.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The present invention is described in accordance with several preferred embodiments which are to be viewed as illustrative without being limiting. These several preferred embodiments are based upon mainframe hardware components and various operating system software components available from Unisys Corporation.

Figure 1:
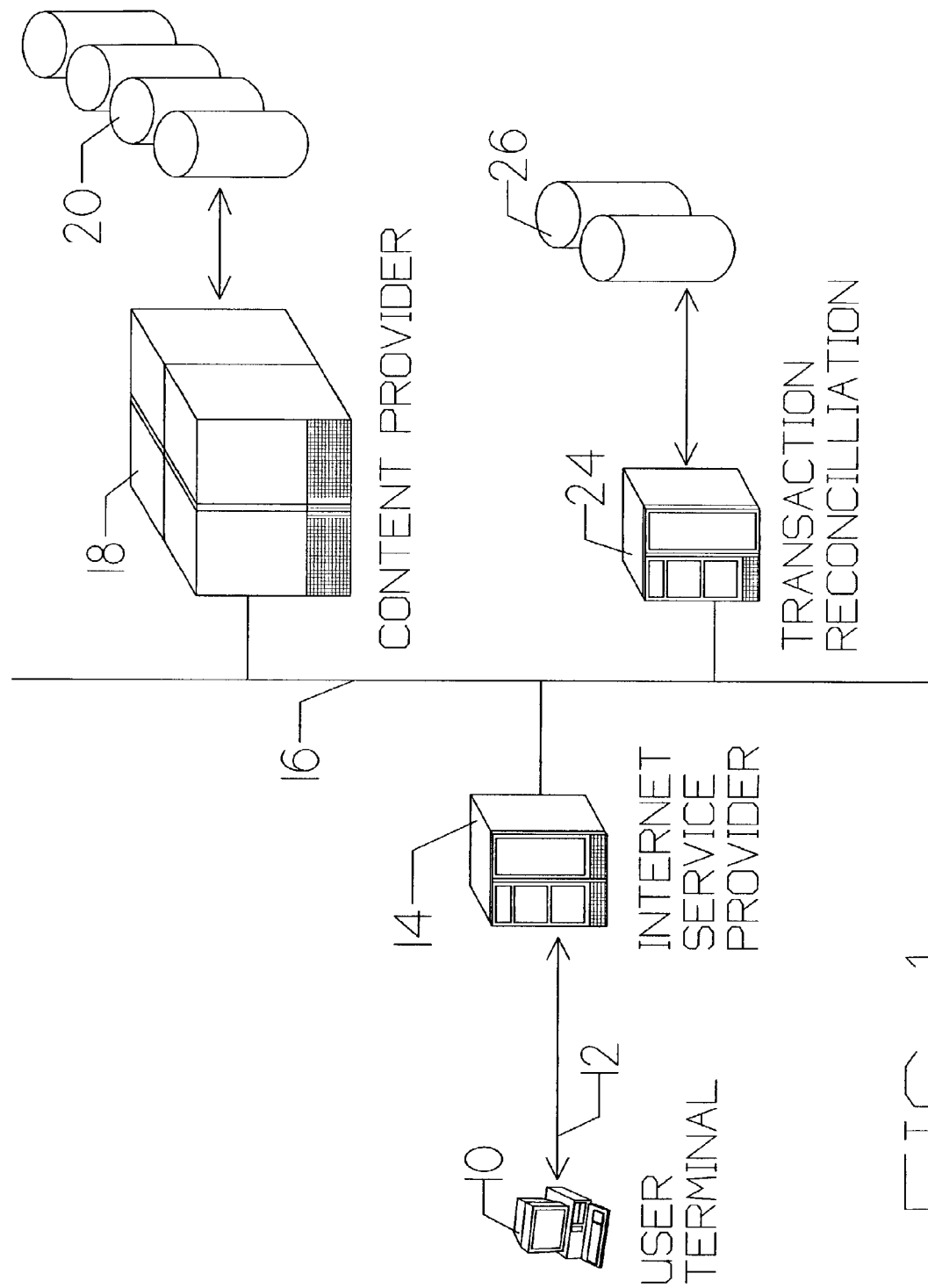
FIG. 1 is detailed schematic drawing of the overall system of the present invention.

FIG. 1 is a detailed diagram showing the major components of the preferred mode of practicing the present invention. Though the preferred mode involves communication over the Internet, other embodiments involving other communication networks (e.g., wireless) should be readily apparent.

User terminal 10 is a standard Internet access device and preferably an industry compatible personal computer. It is coupled to Internet Service Provider (ISP) 14 via line 12. This may be a standard telephone line for dial-up service, a Digital Service Link (DSL) for higher performance, a dedicated network, or a wireless link. Internet Service Provider 14 is typically a commercial entity which charges a subscription fee to users for utilization of the Internet Service Provider's access to Internet 16.

Any given Internet Service Provider 14 may offer only the Internet access or may offer other related services. However, it is important that Internet Service Provider 14 at least offer network access at a subscription price which is periodically invoiced to its subscribing users. This is necessary because Internet Service Provider 14 will be responsible in accordance with the preferred mode of the present invention to add to each of those invoices the sum total of the micropayments due from the corresponding subscriber during the subscription period. The addition of these micropayments to the invoice will require the prior approval of the subscribing user, which will ordinarily be a condition of the subscription service.

Coupled to Internet Service Provider 14 via Internet 16 is Content Provider 18, which is representative of a plurality of providers of the goods and services associated with the microsales. When Content Provider 18 sells access to various digitally coded intellectual property (e.g., digitized audio recordings, digitized video, etc.), data storage 20 can hold the corresponding files. Data Storage 20 may or may not be a separate server depending upon how the invention is implemented. This could be a virtual location rather than a physical one. Data storage 20 can also be utilized to store microsales information (i.e., Invoice Log as explained in detail below).

Also coupled to Internet Service Provider 14 via Internet 16 is Transaction Reconciliation 24. This is a server which performs the automated reconciliation necessary to the micropayments enabled by the present invention as explained in detail below. Transaction Reconciliation 24 also contains storage facility 26.

Figure 2:
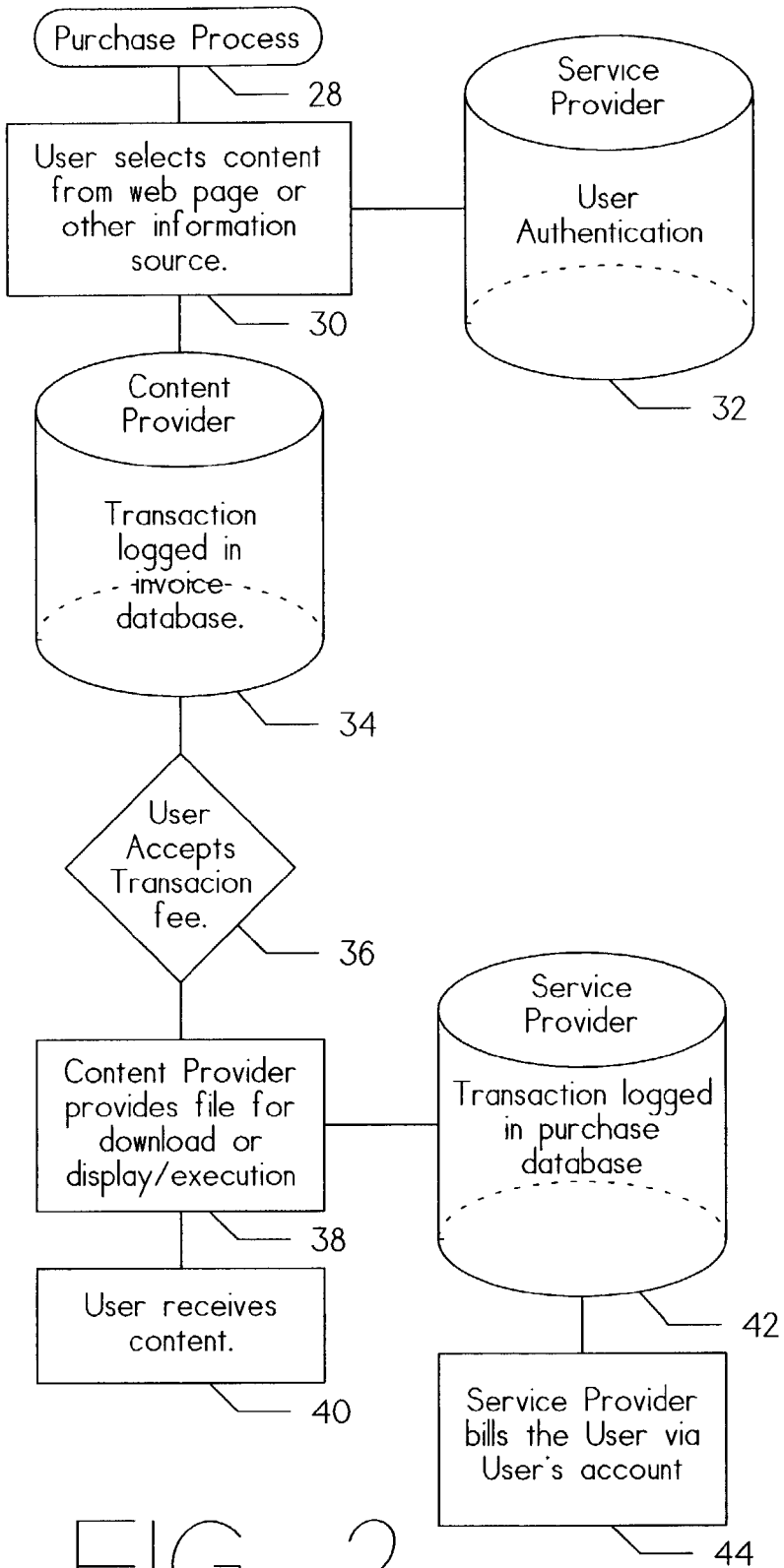
FIG. 2 is a detailed flow diagram showing the operation of a purchase in accordance with the preferred mode of the present invention.

FIG. 2 is a detailed flow diagram of purchase process 28. It begins at element 30 with the selection of the desired content by the user. This is typically done through access to the web pages of Content Provider 18 (see also FIG. 1). Corresponding to this selection is user authentication by Service Provider 14 at element 32. This user authentication essentially verifies that the requesting user has previously agreed to pay for the content to be ordered. For users who cannot use their normal Service Provider, the use of third party Service Providers is encompassed within this approach. In addition, user authentication also verifies the user ID and other information to ensure a secure microsale.

The user selection is transferred to Content Provider 18 as shown at element 34. Content Provider 34 records the transaction in the Transaction Log which is kept in Data storage 20. At element 36, the user accepts the transaction fee. In accordance with the preferred mode of the present invention, this is a small amount of money (i.e., micropayment) of less than a couple of U.S. dollars and often less than one U.S. dollar.

Assuming that the user accepts the fee, Content Provider 18 provides the selected file from Data storage 20 for download, display, or execution at element 38. The same transaction is also logged by Internet Service Provider 14 at element 42. At element 40, the user receives the purchased content. At element 44, Internet Service Provider 44 debits the users account. The final bill to be sent to the user will not occur until reconciliation, which is discussed in detail below.

Figure 3:
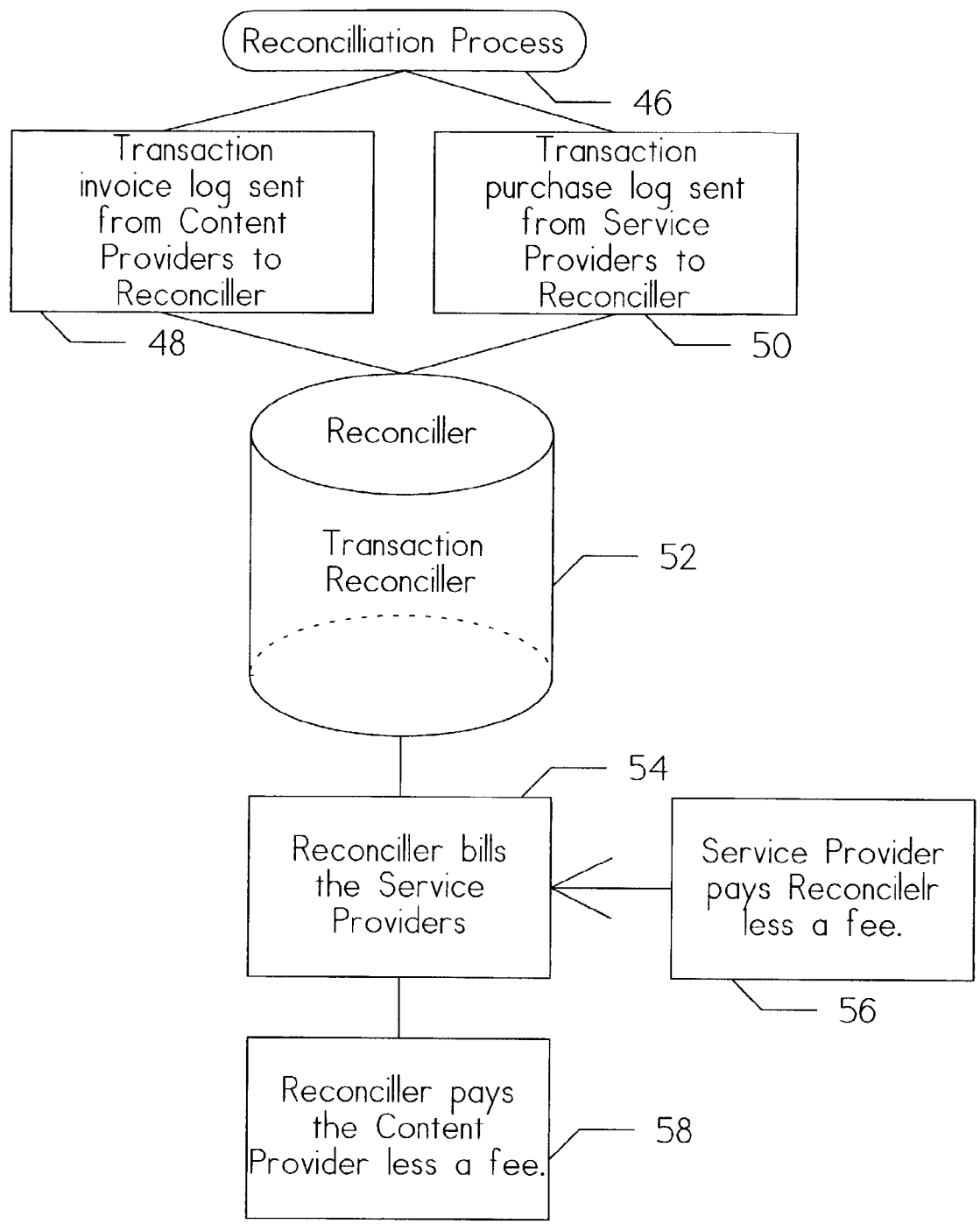
FIG. 3 is a detailed flow diagram showing the reconciliation process.

FIG. 3 is a detailed flow diagram of reconciliation process 46. Upon reconciliation, a copy of the Transaction Log is requested from Content Provider 18 and sent to Transaction Reconciliation 24 as shown in element 48. Similarly, element 50 shows that a copy of the Purchase Log is requested from Internet Service Provider 14 and sent to Transaction Reconciliation 24.

Upon receipt of the copies of the Transaction Log and Purchase Log, Transaction Reconciliation 24 performs the reconciliation at element 52. The reconciliation process involves verification that the Transaction Log and Purchase Log contain the same essential information for each and every transaction. These comparisons employ some "fuzzy logic" to ensure that slightly differing entries for the same transaction do not necessarily cause a comparison "miss".

After reconciliation is complete, Transaction Reconciler 24 sends a bill to Internet Service Provider 14 for the cost of the sum of all transactions for all subscribers of Internet Service Provider 14 during the billing period. Each of the other participating Internet Service Provider(s) (not shown) is similarly billed for services provided to its subscribers.

Internet Service Provider 14 remits a payment to Transaction Reconciler 24 at element 56. Internet Service Provider 14 is provided a portion of total collected fee as its handling charge. After all payments have been received for Content Provider 18, Transaction Reconciler 24 submits payment to Content Provider 18 for all content provided during the billing period. Other content provider(s) not shown receive similar payments for the content which they have provided.

In this manner, Transaction Reconciler 24 preferably sorts individual payments from a plurality of Internet service providers corresponding to content provided to a plurality of subscribers into a plurality of payments to individual content providers on the basis of content provided during the billing period.

Figure 4:
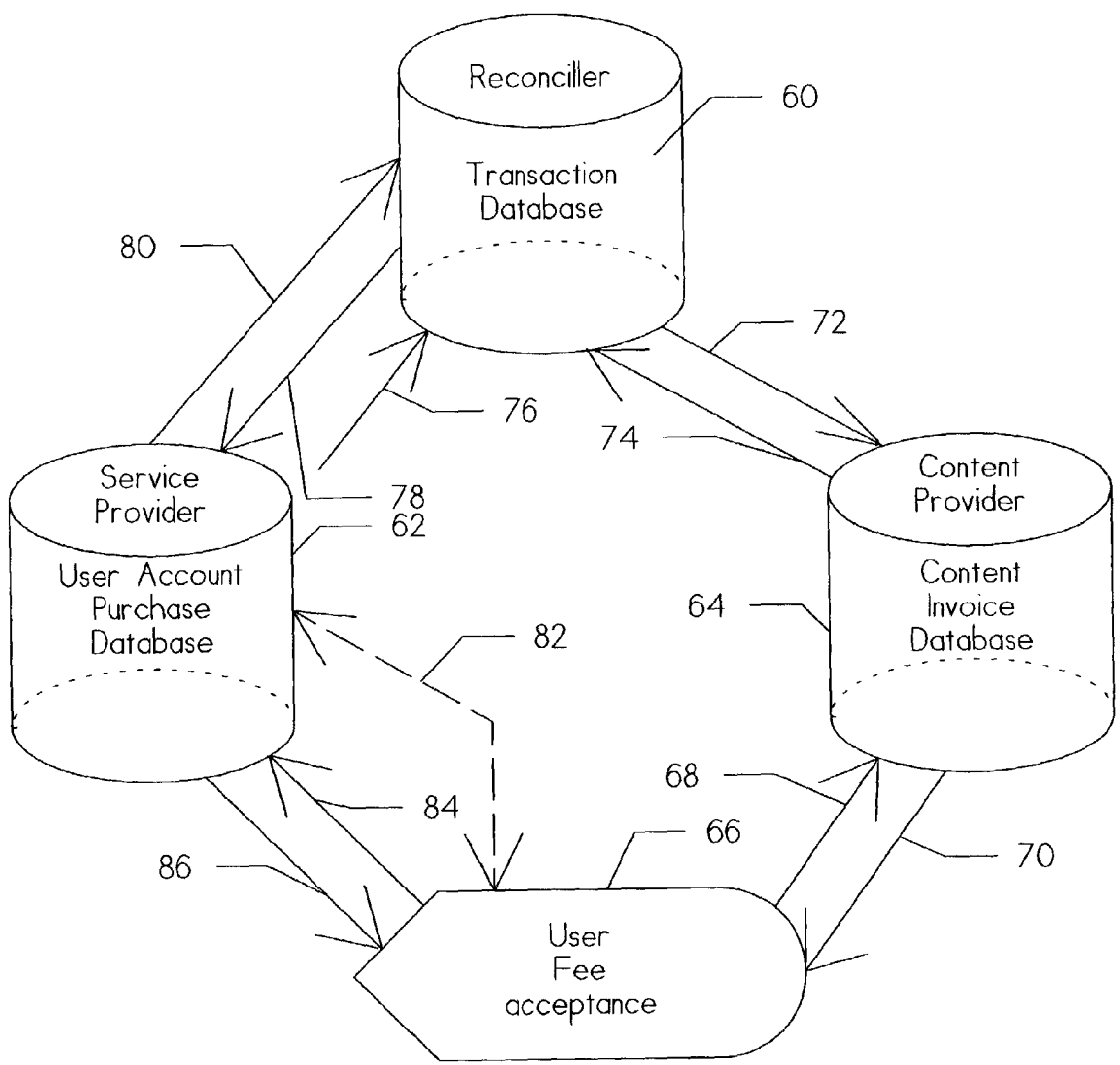
FIG. 4 is a detailed schematic diagram showing data flow within the system of the present invention.

FIG. 4 is a detailed diagram showing functional flow between major components of the preferred mode of the present invention. The process is initiated when User 66 makes a purchase request of content provider 64 via path 68. This is a depiction of functional flow, of course. The actual physical request is made from User 10 via Internet Service Provider 14 and Internet 16 to Content Provider 18 as shown in FIG. 1.

User authentication is performed via bi-directional pathway 82 from Service Provider 62 User 66 accepts the fee, and Service provider 62 makes a Purchase Database entry, as well, to record the requested purchase. Content provider 64 accesses the requested content and creates an Invoice Database entry corresponding to the purchase. The content is provided from content provider 64 to user 66 via path 70. This completes the micropurchase.

In reality, there are a number of content providers, such as content provider 66, responding to a plurality of service providers, such as 62, each having a plurality of users, such as user 66. Thus, after a period of time, usually one month, each of the plurality of content providers will have an Invoice Log containing entries associated with users being subscribers of a number of service providers. Similarly, over the same period, each of the plurality of service providers will have a Transaction Log having entries for purchases by its subscribing users from a number of content providers. As a result, reconciler 60 needs to sort out these data so that each user is billed for all corresponding purchases through its service provider and each content provider is compensated from all purchases made during the purchase period.

To accomplish this result, all service providers, such as service provider 62, send a copy of their Transaction Logs to reconciler 60 via path 76, for example. Similarly, all content providers, such as content provider 64, send a copy of their Invoice Logs to reconciler 60, via path 74, for example. Reconciler 60 matches each entry of all Transaction Logs with each entry of all Invoice Logs to find proper correspondence. Any errors found are corrected during this process.

After reconciliation is complete, reconciler 60 provides a request for payment to each of the plurality of service providers, such as to service provider 62 via path 78. For each service provider, this request for payment directly corresponds to the reconciled Transaction Log of that service provider. It is the responsibility of each service provider to post the payment requests to the accounts of its various subscribing users as explained above. Payment is remitted via path 80.

Upon receipt of all payments, reconciler 60 sends the appropriate payment to each of the content providers. Each of these payments to the content providers will directly correspond to the reconciled Invoice Log. Payment to content provider 64 is via path 72.

Having thus described the preferred embodiments of the present invention, those of skill in the art will be readily able to adapt the teachings found herein to yet other embodiments within the scope of the claims hereto attached.

I claim:

1. In a data processing system, the improvement comprising:
   a. a first computer which permits a user to make a request;
   b. a second computer having a service provider responsively coupled to said first computer;
   c. a third computer having a content provider responsively coupled to said first computer via said second computer;
   d. a fourth computer having a reconciler responsively coupled to said service provider and said content provider which verifies an amount payable to said content provider by said user;
   e. a publically accessible digital data communication network wherein said content provider, said service provider, and said reconciler are responsively coupled; and
   f. a transaction log prepared by said service provider and an invoice log prepared by said content provider.

2. The improvement according to claim 1 wherein said transaction log and said invoice log are transferred to said reconciler to permit verification.

3. The improvement according to claim 2 wherein said publically accessible digital communication network further comprises the Internet.

4. An apparatus comprising:
   a. a user computer;
   b. a service provider computer responsively coupled to said user computer;
   c. a content provider computer responsively coupled to said service provider computer;
   d. a reconciler computer responsively coupled to said service provider computer and said content provider computer which determines a payment to be made;
   e. a publically accessible digital data communication network which responsively couples said service provide computer, said content provider computer, and said reconciler computer; and
   f. a transaction log prepared by said service provider computer to record purchases and an invoice log prepared by said content provider computer to record purchases.

5. The apparatus of claim 4 wherein said service provider computer provides said transaction log to said reconciler computer and said content provider computer provides said invoice log to said reconciler computer.

6. A method of conducting transactions comprising:
   a. requesting content from a content provider by a user via a service provider;
   b. recording said transaction by said service provider in a transaction log;

c. recording said transaction by said content provider in an invoice log; and
d. reconciling by a reconciler said transaction log and said invoice log.

7. A method according to claim 6 further comprising requesting payment by said reconciler from said service provider for entries on said reconciled transaction log.

8. A method according to claim 7 further comprising paying said content provider in accordance with said reconciled invoice log.

9. A method according to claim 8 wherein said reconciling step employs fuzzy logic which does not require an exact match.

10. A method according to claim 9 wherein said reconciler is responsively coupled to said service provider and said content provider via the Internet.

11. An apparatus comprising:
a. means for providing a subscribing user to interface with the Internet having a means for recording transactions;
b. means responsively coupled to said providing means for offering content for sale to said subscribing user having a means for recording purchases; and
c. means responsively coupled to said providing means and said offering means for reconciling said transaction recording means with said purchase recording means.

12. An apparatus according to claim 11 wherein said providing means further comprises an Internet service provider.

13. An apparatus according to claim 12 wherein said reconciling means is responsively coupled to said providing means and said offering means via the Internet.

14. An apparatus according to claim 13 wherein said providing means further comprises a user terminal responsively coupled to said Internet service provider.

15. An apparatus according to claim 14 wherein said user terminal further comprises an industry standard personal computer.

* * * * *